US012805487B1

(12) United States Patent
Kuykendall

(10) Patent No.: US 12,805,487 B1
(45) Date of Patent: Nov. 24, 2026

(54) INTERACTIVE PET COMMUNICATION AND ENTERTAINMENT DEVICE

(71) Applicant: Tamara Kuykendall, Deer Lodge, TN (US)

(72) Inventor: Tamara Kuykendall, Deer Lodge, TN (US)

( * ) Notice: Subject to any disclaimer, the term of this patent is extended or adjusted under 35 U.S.C. 154(b) by 0 days.

(21) Appl. No.: 19/453,474

(22) Filed: Jan. 20, 2026

Related U.S. Application Data

(60) Provisional application No. 63/894,736, filed on Oct. 7, 2025.

(51) Int. Cl.
*A01K 15/02* (2006.01)

(52) U.S. Cl.
CPC .................................. *A01K 15/025* (2013.01)

(58) Field of Classification Search
CPC ............................ A01K 15/021; A01K 15/025
See application file for complete search history.

(56) References Cited

U.S. PATENT DOCUMENTS 6,885,305 B2 4/2005 Davis
7,252,510 B1 * 8/2007 Basu ........................ G09B 5/06 434/335
11,389,735 B2 7/2022 Ganz
12,567,338 B1 * 3/2026 Williams .............. G06F 3/0412
2008/0282988 A1 * 11/2008 Bloksberg ............ A01K 15/021 119/51.02
2009/0090305 A1 4/2009 Cheok
2014/0000530 A1 * 1/2014 Salas .................... A01K 15/025 119/707
2016/0015005 A1 1/2016 Brown, Jr.
2016/0048890 A1 * 2/2016 Viale .................. G06Q 30/0277 705/14.73

(Continued)

FOREIGN PATENT DOCUMENTS

CN 222337606 U * 1/2025
JP 2008099645 A * 5/2008

(Continued)

*Primary Examiner* — Monica L Perry
*Assistant Examiner* — Aaron M Rodziwicz
(74) *Attorney, Agent, or Firm* — Brennan, Manna & Diamond, LLC

(57) ABSTRACT

An interactive pet communication and entertainment device that enables animals to independently initiate interaction, entertainment, and communication using paw (i.e., touch) based input is disclosed. The device includes a chew-resistant, impact-resistant housing formed in a paw-shaped configuration, a touch-sensitive display configured to detect paw input, and a plurality of touch-actuatable (i.e., paw-actuatable) control regions corresponding to distinct functions. A processor, memory, wireless communication module, and power source are disposed within the housing and cooperate to autonomously interpret animal input and execute selected functions without requiring real-time human intervention. The device is configured to provide audio playback, visual output, interactive games, and communication with remote devices. In one embodiment, the device and a mobile computing device executing a mobile application communicate, wherein the devices are securely paired using a unique device identifier to enable remote monitoring and interaction.

20 Claims, 7 Drawing Sheets

(56) References Cited

U.S. PATENT DOCUMENTS

| | | | | |
|---|---|---|---|---|
| 2022/0378017 | A1* | 12/2022 | Ye | G06F 3/04847 |
| 2023/0049347 | A1* | 2/2023 | Chan | A01K 29/00 |
| 2023/0157261 | A1* | 5/2023 | Cunha | A01K 15/02<br>119/719 |
| 2023/0397577 | A1* | 12/2023 | Avdar | A01K 15/021 |

FOREIGN PATENT DOCUMENTS

| | | | | | |
|---|---|---|---|---|---|
| KR | 20230148936 | A | * | 10/2023 | A61B 5/4088 |
| WO | WO-2012045959 | A1 | * | 4/2012 | A01K 5/0114 |
| WO | WO-2015112786 | A1 | * | 7/2015 | A01K 15/02 |
| WO | WO-2022187707 | A1 | * | 9/2022 | A01K 15/021 |

* cited by examiner

INTERACTIVE PET COMMUNICATION AND ENTERTAINMENT DEVICE

CROSS-REFERENCE TO RELATED APPLICATION

The present application claims priority to, and the benefit of, U.S. Provisional Application No. 63/894,736 which was filed on Oct. 7, 2025, and is incorporated herein by reference in its entirety.

FIELD OF THE INVENTION

The present invention generally relates to interactive pet care devices. More specifically, the present invention relates to a paw-operated communication and entertainment device configured to enable pets to independently initiate interaction, stimulation, and communication without requiring real-time human control. The invention comprises a multi-component electronic assembly that includes a chew-resistant and impact-resistant housing formed in a paw-shaped configuration, a front surface defining a touch-sensitive display region, and a plurality of touch-actuatable (i.e., paw-actuatable) control regions configured to be selectively actuated by an animal. The device further includes a processor, memory, wireless communication module, audio input and output components, and a power source, all operatively coupled to enable autonomous execution of functions including audio playback, visual display output, interactive gameplay, and communication with remote devices. In some embodiments, the device is configured to securely pair with a mobile computing device executing a mobile application that provides a graphical interface for remote interaction, monitoring, scheduling, and configuration, thereby enabling real-time and automated pet engagement and communication. Accordingly, the present disclosure makes specific reference thereto. Nonetheless, it is to be appreciated that aspects of the present invention are also equally applicable to other like applications, devices, and methods of manufacture.

BACKGROUND

By way of background, domestic animals, particularly companion pets such as dogs and cats, often experience boredom, stress, or anxiety when left alone for extended periods of time. Such conditions may result in undesirable behaviors including excessive chewing, scratching, vocalization, or other destructive actions, as well as behavioral or emotional distress.

Pet owners may also experience concern, guilt, or uncertainty regarding the mental well-being of their pets during periods of absence. While owners may seek to provide comfort or enrichment, existing solutions offer limited effectiveness in addressing real-time emotional or behavioral needs of animals.

Traditional pet toys, feeding devices, and treats provide only passive engagement and lack the ability to offer interactive stimulation, communication, or adaptive responses. Other available technologies, such as pet monitoring cameras or two-way audio devices, are primarily designed for human operation and require active initiation by the owner. Conventional systems do not allow pets to independently initiate interaction or control the device in response to their own needs. Accordingly, individuals desire an interactive, pet-controlled system that enables animals to autonomously initiate engagement, entertainment, and communication.

Therefore, there exists a long-felt need in the art for an interactive pet communication and entertainment device that addresses boredom, anxiety, and stress experienced by pets when left alone. There is a further long-felt need for a device that allows pets to independently initiate interaction, stimulation, or communication without reliance on real-time human control. Additionally, there exists a need for a durable, pet-safe device specifically designed to withstand chewing, scratching, and rough handling while remaining intuitive for paw-based operation. Moreover, there exists a need for a system that provides real-time comfort and engagement for pets while simultaneously reducing owner concern regarding pet well-being during absences. Finally, there is a need for an interactive system that enables both pet-to-owner and pet-to-pet communication in a controlled and secure manner.

The subject matter disclosed and claimed herein, in one embodiment, comprises an interactive pet communication and entertainment device configured to enable autonomous, paw-initiated interaction by an animal. The device includes a housing formed in a paw-shaped configuration from chew-resistant, impact-resistant, and non-toxic materials, a touch-sensitive display configured to detect paw-based input, and a plurality of touch-actuatable (i.e., paw-actuatable) control regions corresponding to distinct functions. The device further includes a processor, memory, wireless communication module, audio output elements, and a power source, all configured to cooperate to provide audio playback, visual output, interactive games, and communication sessions. The device is specifically designed to allow pets to intentionally actuate functions using natural paw movements without requiring human initiation at the time of use.

In one embodiment, the interactive pet device is operable as part of a broader system that includes a mobile computing device executing a mobile application. The device and the mobile computing device are configured to establish a secure pairing using a unique device identifier. Once paired, the mobile application enables an operator to monitor interaction activity, transmit live or prerecorded audio or audio-visual content, initiate calm routines, schedule automated interactions, and receive data generated by pet actuation. In additional embodiments, the device is configured to communicate with other similar devices, thereby enabling pet-to-pet actuation through authenticated inter-device communication channels.

In this manner, the interactive pet communication and entertainment device of the present invention overcomes long-standing deficiencies in the art by providing a durable, pet-controlled, and autonomous interaction platform. The invention enables pets to independently engage with entertainment and communication features, reduces anxiety-related and destructive behaviors, and provides owners with peace of mind through remote interaction and monitoring. The system further offers enhanced behavioral stimulation, emotional comfort, and flexibility through scheduling, conditional triggers, and secure communication.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an interactive pet communication and entertainment device that includes a housing formed in a paw-shaped configuration and fabricated from chew-resistant, impact-resistant, and non-toxic materials. A touch-sensitive display is disposed on a front surface of the housing and is configured to detect paw-based input from an animal. The device further includes a plurality of touch-actuatable (i.e., paw-actuatable) control regions disposed on the front surface of the housing, each control region corresponding to a distinct function. One or more audio output elements in the form of speakers are disposed within the housing. The device includes a processor operatively coupled to the touch-sensitive display and the touch-actuatable (i.e., paw-actuatable) control regions, a memory operatively coupled to the processor and storing executable instructions, a wireless communication module operatively coupled to the processor, and a power source disposed within the housing. The processor is configured to execute the executable instructions to autonomously interpret paw-based input received via the touch-sensitive display or the control regions and to trigger at least one selected function, including audio playback, visual display output, interactive gameplay, or communication with a paired remote device, without requiring real-time human intervention.

In another embodiment, the invention provides a pet actuation system that includes a paw-operated interactive device comprising a processor, a touch-sensitive display, a plurality of touch-actuatable (i.e., paw-actuatable) control regions, and a wireless communication module, and a mobile computing device executing a mobile application. The paw-operated interactive device and the mobile computing device are configured to establish a secure pairing using a unique device identifier. Once paired, the mobile application enables an operator to initiate, monitor, and control live interaction sessions with the paw-operated interactive device, including transmitting audio or audiovisual content to the device and receiving interaction data generated by the animal during use.

In a further embodiment, the invention provides a method of operating an interactive pet communication device. The method includes receiving a paw-based input on a touch-sensitive display or a touch-actuatable (i.e., paw-actuatable) control region of the device and interpreting the paw-based input using a processor of the device to determine a corresponding function. The method further includes autonomously triggering the corresponding function in response to the interpreted input. The triggered function may include playing audio content, executing an interactive game, displaying visual content, or establishing a communication session with a paired remote device, thereby enabling independent animal-initiated interaction.

In still another embodiment, a non-transitory computer-readable medium storing instructions that, when executed by a processor of a mobile computing device, cause the mobile computing device to establish a secure pairing with a paw-operated interactive pet device using a unique device identification value. The instructions further cause the mobile computing device to display a graphical user interface enabling live interaction with the paw-operated interactive pet device, transmit audio or audiovisual content to the paw-operated interactive pet device, and receive interaction data generated by paw-based input at the paw-operated interactive pet device.

In one aspect, the device includes a plurality of touch-actuatable (i.e., paw-actuatable) control regions disposed on a front surface of the housing and positioned for natural engagement by an animal. Each touch-actuatable (i.e., paw-actuatable) control region is configured to be actuated through application of pressure by a paw, nose, or other body part of the animal and may be implemented as a physical button, a pressure-sensitive region, or a touch-responsive area integrated with the display. The control regions are sized, spaced, and shaped to accommodate paw-based interaction and to reduce inadvertent actuation.

In one embodiment, the interactive pet communication and entertainment device includes a plurality of touch-actuatable (i.e., paw-actuatable) control regions that are visually represented by simplified iconography. The simplified iconography comprises high-contrast shapes, symbols, or pictorial representations selected to be recognizable by an animal through repeated association.

In another embodiment, the interactive pet communication and entertainment device is configured to discourage destructive animal behavior by providing an immediate responsive alternative stimulus upon detection of paw-based input. When the animal actuates the device, the device generates a responsive auditory, visual, or interactive output that redirects attention of the animal away from undesirable behaviors such as chewing, scratching, or excessive vocalization.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
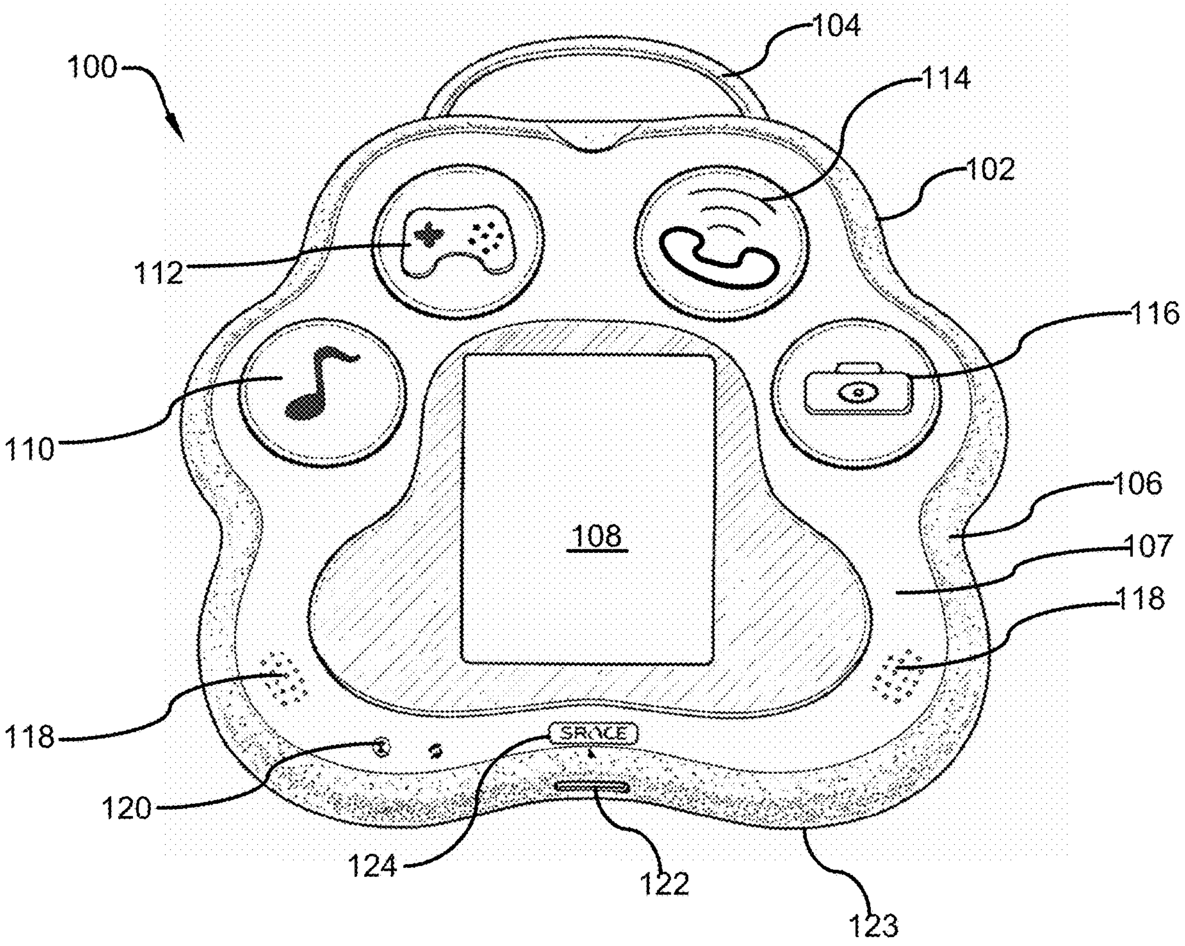
FIG. 1 illustrates a perspective view of interactive pet communication and entertainment device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an interactive pet communication and entertainment device that addresses boredom, anxiety, and stress experienced by pets when left alone. There is a further long-felt need for a device that allows pets to independently initiate interaction, stimulation, or communication without reliance on real-time human control. Additionally, there exists a need for a durable, pet-safe device specifically designed to withstand chewing, scratching, and rough handling while remaining intuitive for paw-based operation. Moreover, there exists a need for a system that provides real-time comfort and engagement for pets while simultaneously reducing owner concern regarding pet well-being during absences. Finally, there is a need for an interactive system that enables both pet-to-owner and pet-to-pet communication in a controlled and secure manner.

The present invention, in one exemplary embodiment, is a method of operating an interactive pet communication device. The method includes receiving a paw-based input on a touch-sensitive display or a touch-actuatable (i.e., paw-actuatable) control region of the device and interpreting the paw-based input using a processor of the device to determine a corresponding function. The method further includes autonomously triggering the corresponding function in response to the interpreted input. The triggered function may include playing audio content, executing an interactive game, displaying visual content, or establishing a communication session with a paired remote device, thereby enabling independent animal-initiated interaction.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of interactive pet communication and entertainment device of the present invention in accordance with the disclosed structure. The interactive pet communication and entertainment device 100 of the present invention is designed as a tablet-like interactive device specifically configured for pets. The device 100 is configured to provide entertainment, communication, and comfort to a pet through sound, visual cues, and touch-based interaction.

The device 100 includes a housing 102 that defines the primary structural body of the device 100. The housing 102 is formed in a generally paw-shaped configuration to promote intuitive interaction by a pet and to visually indicate areas intended for paw contact. The housing 102 is fabricated from a chew-resistant, impact-resistant, and non-toxic material, such as reinforced polymer, rubberized composite, or silicone-coated plastic, thereby enabling the device 100 to withstand scratching, biting, saliva exposure, and repeated impacts.

The housing 102 further includes a rounded peripheral edge 106 extending continuously around the device 100. The peripheral edge 106 is contoured to eliminate sharp corners and reduce the risk of injury to an animal during use. In addition, the peripheral edge 106 provides shock absorption and structural reinforcement.

A handle portion 104 is positioned along an upper region of the housing 102. The handle 104 may be integrally molded with the housing 102 or attached thereto and is configured to permit a human operator to easily lift, carry, reposition, or mount the device 100.

A front surface 107 of the housing 102 includes a touch-sensitive display 108. The display 108 can comprise a pressure-sensitive or capacitive touch screen reinforced with a protective layer, such as tempered glass or polycarbonate, and is configured to detect input generated by an animal's paw rather than by a human finger. The display 108 is further configured to visually present interactive content including images, animations, video, icons, or status indicators.

The device 100 includes a plurality of touch-actuatable (i.e., paw-actuatable) control regions disposed in the front surface 107 thereof. Each touch-actuatable (i.e., paw-actuatable) control region is preferably in the form of a physical button that can be pressed by a pet using a paw. In the illustrated embodiment, a music control region 110 is provided and is configured to initiate playback of audio content such as calming sounds, music, or prerecorded messages when actuated by an animal.

A game control region 112 may be positioned adjacent to the display 108 and is configured to initiate one or more interactive games designed specifically for paw-based interaction. Such games may include moving visual targets, sound-triggered responses, or timed activities intended to provide mental stimulation.

A communication control region 114 is further provided and is configured to initiate a communication session. Actuation of the communication control region 114 can cause the device 100 to establish a live or prerecorded audio connection with a paired remote device associated with an owner or another animal.

A camera or visual interaction control region 116 is additionally provided and is configured to initiate visual interaction features, such as displaying a live video feed, capturing images, or enabling video communication when supported by the device configuration.

In the preferred embodiment, the plurality of control regions are visually represented by simplified iconography selected to facilitate recognition by animals through repeated association. The iconography can comprise high-contrast shapes, symbols, or pictorial representations corresponding to specific functions, such as sound playback, interactive games, or communication.

One or more audio output elements 118, such as speakers, are disposed in the housing 102, preferably on opposing sides of the display 108. The audio output elements 118 are configured to emit sound including music, voice communication, alerts, or game-related audio cues.

The device 100 further includes an audio input opening 120, which can be in the form of a microphone. The microphone 120 is configured to capture ambient sounds, animal vocalizations, or audio generated during a communication session for transmission to a paired external device.

A sealed power interface 122, such as a charging port, is disposed along a bottom edge 123 of the housing 102. The power interface 122 is configured to recharge an internal power source, such as a rechargeable battery (FIG. 2), and is enclosed within a waterproof and debris-resistant seal to prevent moisture or contaminants from entering the housing 102.

The device 100 is associated with a unique identification indicator 124 used for uniquely identifying and associating the device 100. The unique identification indicator 124 may be visually displayed or electronically stored within the device 100. The identification indicator 124 corresponds to a unique device identifier used for pairing, authentication, and secure communication between the device 100, an owner-operated mobile application, and other compatible (i.e., remote) devices.

The device 100 of the present invention is configured to discourage destructive animal behavior by providing a responsive alternative stimulus when actuated. Upon detection of paw-based input, the device generates an immediate auditory, visual, or interactive response, thereby redirecting the animal's attention away from undesirable behaviors such as chewing, scratching, or excessive vocalization (i.e., barking). By offering a positive and engaging stimulus in response to interaction, the device 100 promotes constructive engagement and mental stimulation, reducing stress-related or boredom-induced destructive behavior (i.e., separation anxiety).

Figure 2:
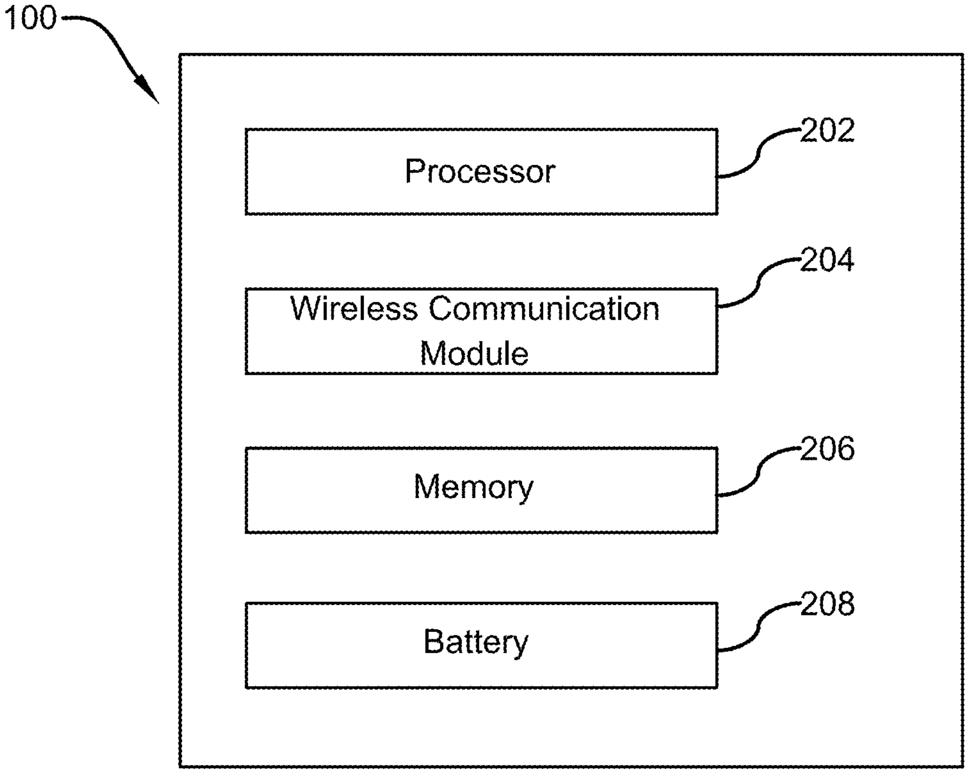
FIG. 2 illustrates a block diagram showing internal electronic components of the interactive, paw-operated electronic device of the present invention in accordance with the disclosed structure.

FIG. 2 illustrates a block diagram showing internal electronic components of the interactive, paw-operated electronic device of the present invention in accordance with the disclosed structure. As shown in FIG. 2, the device 100 includes a processor 202. The processor 202 can comprise one or more microprocessors, microcontrollers, system-on-chip (SoC) devices, or other programmable logic components. The processor 202 is configured to execute instructions, process input signals generated by animal (i.e., pet) interaction, and control execution of device functions including audio playback, visual display output, game execution, and communication sessions. The processor 202 is configured to receive signals from actuation of the touch-actuatable (i.e., paw-actuatable) control regions and remote devices as described later in the disclosure.

The device 100 further includes a wireless communication module 204 operatively coupled to the processor 202. The wireless communication module 204 is configured to enable data transmission and reception between the device 100 and one or more external devices or networks. In various embodiments, the wireless communication module 204 supports one or more wireless communication protocols including, but not limited to, Wi-Fi, Bluetooth, Bluetooth Low Energy (BLE), cellular, or other short-range or long-range wireless standards. The wireless communication module 204 facilitates pairing, live communication, and data synchronization with remote devices such as owner-operated mobile applications or other paw-operated devices.

A memory component 206 is operatively coupled to the processor 202 and is configured to store executable instructions, configuration parameters, user-defined settings, and data associated with device operation. The memory 206 may include volatile memory, non-volatile memory, or a combination thereof, such as random-access memory (RAM), read-only memory (ROM), flash memory, or other suitable storage media. In the preferred embodiment, the memory 206 stores the unique device identifier, one or more interface layouts displayed by the touch-sensitive display 108, audio files, game data, and interaction logs.

The device 100 additionally includes a power source 208, such as a rechargeable battery. The battery 208 is configured to supply electrical power to the processor 202, wireless communication module 204, memory 206, and other electronic components of the device 100. In some embodiments, the battery 208 can comprise a lithium-ion, lithium-polymer, or other rechargeable energy storage element and may be electrically coupled to a sealed charging interface. The processor 202 may further be configured to monitor battery status and manage power consumption to extend operational life.

Figure 3:
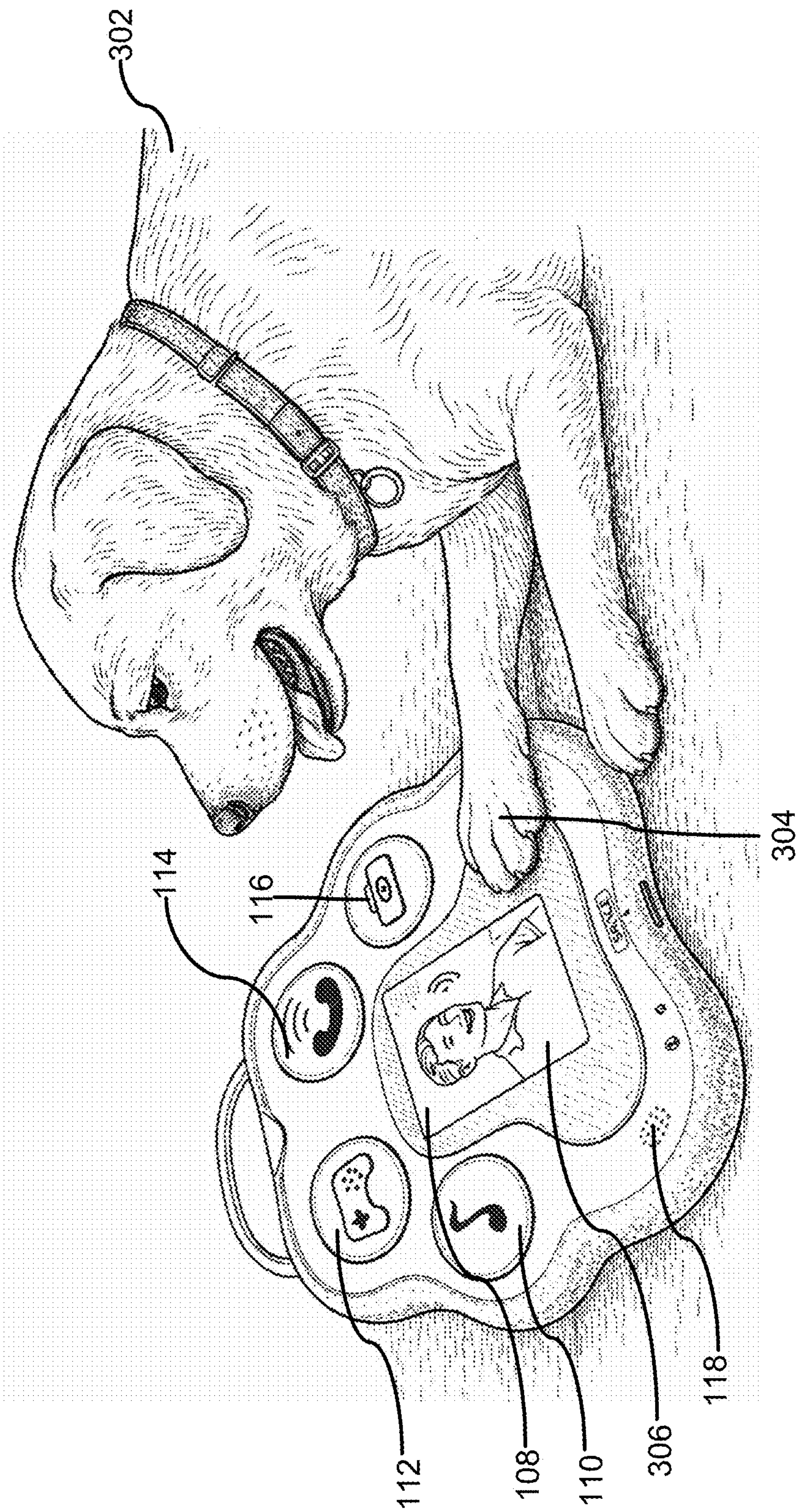
FIG. 3 illustrates a perspective view showing an exemplary use scenario of the interactive and paw-operated electronic device of the present invention in operation with a pet.

FIG. 3 illustrates a perspective view showing an exemplary use scenario of the interactive and paw-operated electronic device of the present invention in operation with a pet. As shown in FIG. 3, the animal 302, illustrated as a dog, is positioned adjacent to the device 100 and is actively interacting with the device using a paw 304. The device 100 is shown resting on a support surface 306, such as a floor or ground surface, during use.

The touch-sensitive display 108 is configured to present visual content. In the illustrated embodiment, the display 108 shows a visual representation of a human user 306 such as owner of the pet 302, indicating an active or initiated communication session. The display 108 is configured to respond to pressure-based input applied by the paw 304 of the animal 302.

As illustrated, the animal 302 actuates the device 100 by placing the paw 304 onto the display 108 or on any of the touch-actuatable (i.e., paw-actuatable) control regions 110, 112, 114, 116, thereby generating an input signal. In response to the paw-based input, the device 100 operates autonomously to execute a corresponding function, such as initiating communication, displaying visual content, or producing audio output, via speakers 118 without requiring real-time human intervention.

Figure 4:
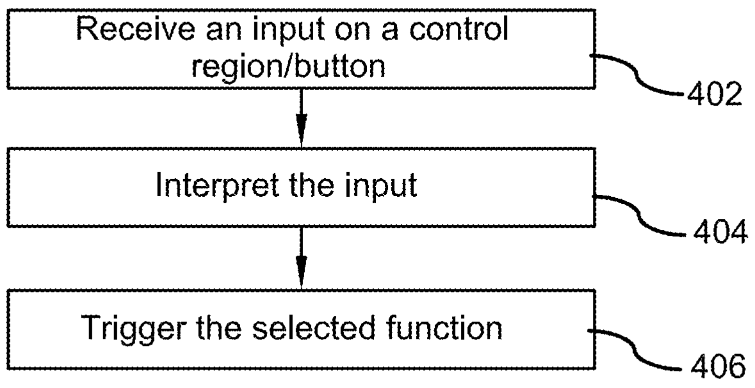
FIG. 4 illustrates a flowchart depicting steps of operation of the interactive and paw-operated electronic device of the present invention in accordance with the disclosed structure.

FIG. 4 illustrates a flowchart depicting steps of operation of the interactive and paw-operated electronic device of the present invention in accordance with the disclosed structure. Initially, the device 100 receives an input on a control region or button (Step 402). The input may be generated by an animal applying pressure to a touch-sensitive display or to a touch-actuatable (i.e., paw-actuatable) control region using a paw, nose, or other body part. The input may include pressure data, location data, or duration of contact and is transmitted to the processor of the device 100.

Then, the processor 100 processes and interprets the received input (Step 404). Interpretation may include determining which control region was actuated, evaluating the intensity or duration of the input, and identifying a corresponding function associated with the selected control region.

At step 406, the device 100 triggers the selected function in response to the interpreted input. The selected function may include initiating audio playback, executing an interactive game, establishing a communication session, displaying visual content, or performing another predefined operation. The device 100 may perform the triggering autonomously without requiring real-time human intervention. It should be noted that depending on actuation of a control region, the device 100 activates and performs the associated functionality, enabling a pet to use the device 100 without any external or human assistance.

Figure 5:
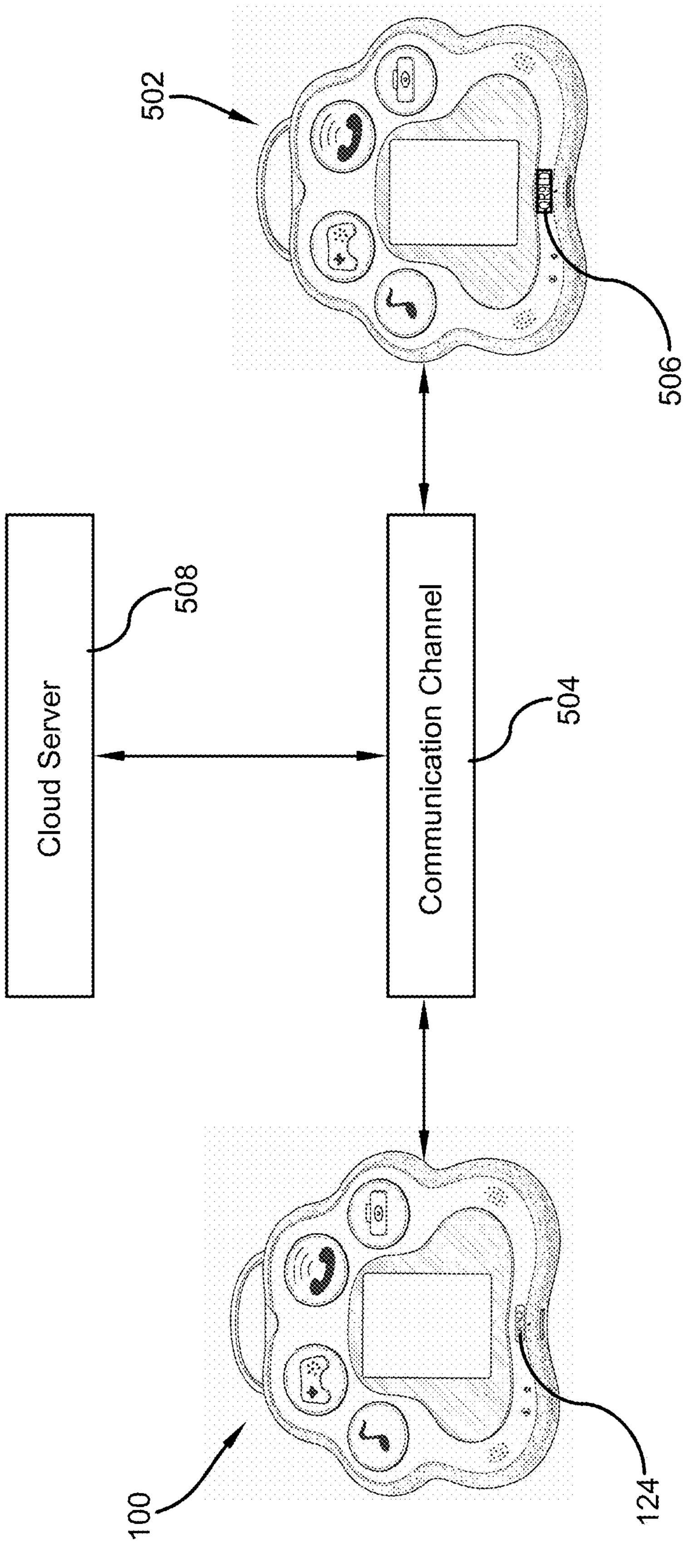
FIG. 5 illustrates a system diagram illustrating an exemplary inter-device communication architecture between multiple paw-operated interactive devices in accordance with the disclosed structure.

FIG. 5 illustrates a system diagram illustrating an exemplary inter-device communication architecture between multiple paw-operated interactive devices in accordance with the disclosed structure. As shown in FIG. 5, a first paw-operated interactive device 100 is configured to communicate with a second paw-operated interactive device 502. Each of the devices 100 and 502 may be identical, may correspond to separate animal users, and may be located at different physical locations.

The first device 100 includes the unique device identification element 124, which is configured to uniquely identify the device during pairing, authentication, and communication processes. Similarly, the second device 502 includes a corresponding unique device identification element 506 for identification and secure association.

Communication between the first device 100 and the second device 502 is performed via a communication channel 504 which is established by the wireless communication modules of the devices 100, 502. The communication channel 504 can comprise one or more wired or wireless networks and may support data transmission using protocols such as Wi-Fi, Bluetooth, cellular data, or combinations thereof. The communication channel 504 is configured to transmit audio data, video data, control signals, game data, and other interaction-related information between the devices 100 and 502.

In operation, upon initiation of a communication session by an animal or operator using one of the devices 100 or 502, the initiating device transmits a communication request via the communication channel 504. Upon successful authentication and authorization using the unique device identification elements 124 and 506, a communication session is established, allowing exchange of audio, visual, or interactive content between the devices. It should be noted that the communication control region 114 can be configured to initiate communication with other interactive devices or remote devices.

Figure 6:
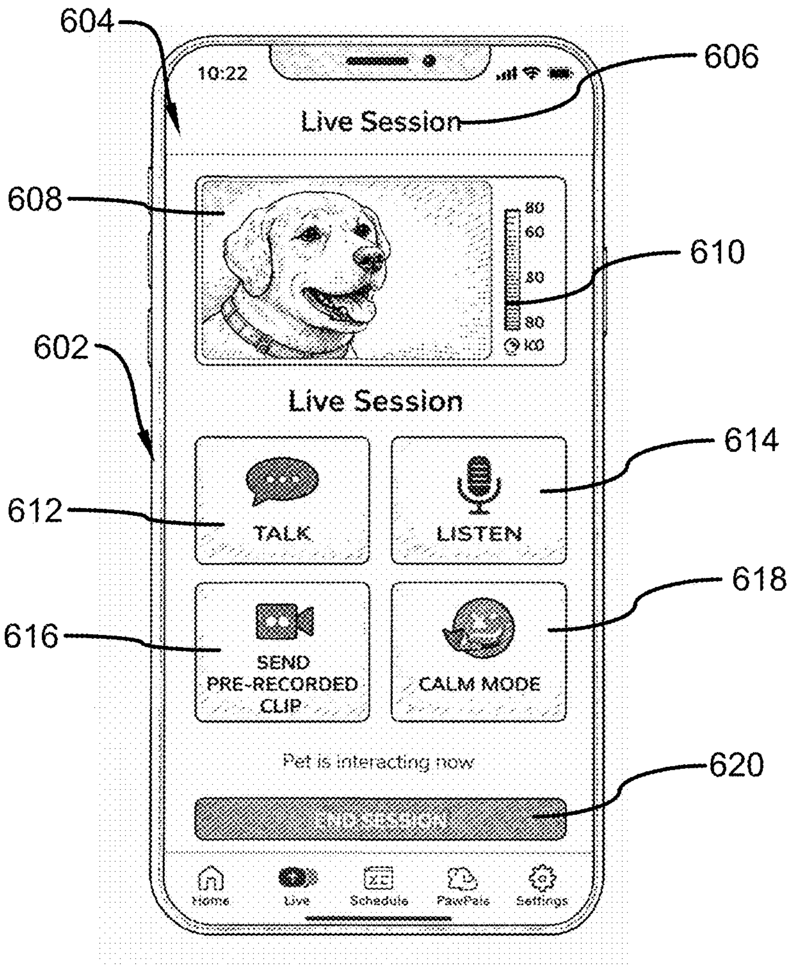
FIG. 6 illustrates an exemplary operator-controlled mobile device interface for real-time interaction with the paw-operated interactive device of the present invention in accordance with the disclosed structure.

FIG. 6 illustrates an exemplary operator-controlled mobile device interface for real-time interaction with the paw-operated interactive device of the present invention in accordance with the disclosed structure. As shown in FIG. 6, a smartphone 602 executes a mobile application 604. The smartphone 602 can comprise any suitable mobile computing device, including a smartphone or tablet, configured to communicate with one or more paw-operated interactive devices via a wireless network. The mobile application 604 is displayed on the smartphone 602 and includes a graphical user interface 606. The interface 606 is configured to enable an operator, such as a pet owner or caregiver, to remotely interact with an animal through the paw-operated interactive device during a live session.

The interface 606 includes a live visual display region 608, which may present a live video feed or a static image received from the paw-operated interactive device 100. In embodiments where a camera is not available, the live visual display region 608 may indicate that the session is operating in an audio-only mode.

An activity or audio level indicator 610 is positioned adjacent to the live visual display region 608 and is configured to display real-time feedback corresponding to sound levels, interaction intensity, or other activity metrics detected by the paw-operated interactive device 100.

The interface 606 includes a plurality of operator-actuatable control elements. A talk control 612 is provided and is configured to enable push-to-talk voice communication from the operator to the paired paw-operated interactive device. A listen control 614 is further provided and is configured to enable live audio monitoring of sounds captured by the paw-operated interactive device.

A prerecorded content control 616 is additionally provided and is configured to allow the operator to select and transmit prerecorded audio or audiovisual content, such as comfort messages or commands, to the paw-operated interactive device. A calm mode control 618 is also provided and is configured to initiate a calming operation, such as reducing screen brightness, lowering audio output levels, and playing soothing sounds on the paw-operated interactive device.

The interface 606 further includes a session termination control 620, which is configured to allow the operator to end the live interaction session. The interface 606 may also display status information indicating that the animal is currently interacting with the paw-operated interactive device.

It should be noted that the mobile application 604 executed on the smartphone 602 is configured to establish a secure pairing with a remote paw-operated interactive device (such as device 100 of FIG. 1). The pairing process may include receiving a unique device identification value from the paw-operated device, such as a device identification number, QR code, near-field communication signal, or wireless broadcast. Upon receipt of the identification value, the mobile application 604 authenticates the paw-operated device and associates it with a user account stored locally on the smartphone 602 or remotely on a server. Once paired, the smartphone 602 and the paw-operated device are permitted to exchange data through an encrypted communication channel, enabling the mobile application 604 to initiate live sessions, transmit audio or audiovisual content, receive interaction data, and manage device settings without requiring repeated authentication.

Figure 7:
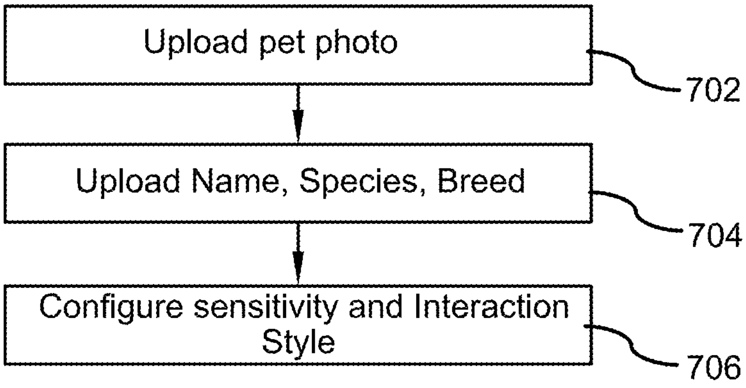
FIG. 7 illustrates a flowchart depicting steps of configuring a pet profile for the paw-operated interactive device in accordance with the disclosed structure.

FIG. 7 illustrates a flowchart depicting steps of configuring a pet profile for the paw-operated interactive device in accordance with the disclosed structure. In the present embodiment, an operator may configure a personalized pet profile in the device 100 such as through a mobile application, thereby enabling tailored operation of the paw-operated interactive device 100 based on the individual characteristics of the pet animal.

At step 702, a pet photo is received from the operator. The mobile application receives an image representing the animal associated with the paw-operated interactive device. The uploaded pet photo may be displayed within the application interface and may be used to personalize interaction sessions, device displays, or identification of the pet profile.

At step 704, pet information is received, including a name, species, and breed. The information may be entered by an operator through the mobile application and stored in association with the pet profile. In some embodiments, the uploaded information is used to customize interface elements, content selection, or interaction parameters specific to the animal.

At step 706, sensitivity and interaction style settings are configured. The configuration may include adjusting input sensitivity thresholds, interaction responsiveness, audio output levels, visual intensity, or other parameters corresponding to size, temperament, or physical interaction characteristics of the animal. The configured sensitivity and interaction style settings enable the paw-operated interactive device to respond appropriately to interaction patterns of the animal.

In some embodiments, the present invention enables scheduling of automated routines through the mobile application, including treat delivery events, night calm routines, and condition-based interactions. An operator may define one or more scheduled actions to occur at predetermined times or intervals, such as dispensing a treat, playing calming audio, dimming a display, or reducing interaction intensity during nighttime hours. Additionally, the device may support conditional triggers, wherein a scheduled or automated action is executed only upon satisfaction of a predefined condition, such as detecting no interaction with the paw-operated interactive device for a specified duration of time. For example, if no paw-based interaction is detected for a user-defined period, the device may automatically initiate a calming routine or present an engaging stimulus to re-engage the animal.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "interactive pet communication and entertainment device", "interactive and paw-operated electronic device", "paw-operated electronic device", and "device" are interchangeable and refer to the interactive pet communication and entertainment device 100 of the present invention.

Notwithstanding the forgoing, the interactive pet communication and entertainment device 100 of the present invention can be of any suitable configuration as is known in the art without affecting the overall concept of the invention, provided that it accomplishes the above stated objectives. One of ordinary skill in the art will appreciate that the interactive pet communication and entertainment device 100 shown in the FIGS. are for illustrative purposes only, and that many other configurations of the interactive pet communication and entertainment device 100 are well within the scope of the present disclosure. Although the dimensions of the interactive pet communication and entertainment device 100 are important design parameters for user convenience, the interactive pet communication and entertainment device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pet communication and entertainment device comprising:

a housing;

a processor;

a wireless communication module;

a plurality of paw-actuatable control regions; and a paired remote device;

wherein said housing comprising a material selected from the group consisting of a reinforced polymer, a rubberized composite, and a silicone-coated plastic;

wherein said housing comprising a shock absorbing peripheral edge;

wherein said processor comprises one or more selected from the group consisting of microprocessors, microcontrollers, system-on-chip (SoC) devices, and programmable logic components configured to execute instructions, process input signals generated by pet actuation, and control execution of received signals from actuation of said plurality of paw-actuatable control regions and said paired remote device;

wherein said plurality of paw-actuatable control regions comprise pressure-sensitive touch screens;

wherein said plurality of paw-actuatable control regions are configured to detect input generated by an animal's paw;

wherein a front surface of said housing comprises a display for visually presenting one or more selected from the group consisting of an image, an animation, a video, an icon, and a status indicator;

wherein said wireless communication module is operatively coupled to said processor and is configured to enable data transmission and reception between the pet communication and entertainment device and one or more said paired remote device; and further wherein said plurality of paw-actuatable control regions comprise one or more selected from the group consisting of a music control region, a game control region, a communication control region, and a visual interaction control region.

2. The pet communication and entertainment device of claim 1, wherein said music control region comprises playback of audio content selected from the group consisting of calming sounds, music, and prerecorded messages when actuated by the pet.

3. The pet communication and entertainment device of claim 2, wherein said game control region is configured to initiate one or more interactive games selected from the group consisting of moving visual targets, sound-triggered responses, and timed activities for mental stimulation of the pet when actuated by the pet.

4. The pet communication and entertainment device of claim 3, wherein said communication control region is configured to initiate an audio connection with said paired remote device when actuated by the pet.

5. The pet communication and entertainment device of claim 4, wherein said visual interaction control region is configured to initiate visual interaction features selected from one or more of the group consisting of a live video feed, capturing images, and video communication with said paired remote device when actuated by the pet.

6. The pet communication and entertainment device of claim 5, wherein said plurality of paw-actuatable control regions are visually represented by one or more selected from the group consisting of high-contrast shapes, symbols, and pictorial representations corresponding to a function of each of said plurality of paw-actuatable control regions.

7. The pet communication and entertainment device of claim 6, wherein said housing comprising one or more audio output elements configured to emit sound in response to actuation of said plurality of paw-actuatable control regions, and further wherein said housing comprising an audio input opening configured to capture one or more selected from the group consisting of ambient sounds, animal vocalizations, and audio generated during a communication session for transmission to said paired remote device.

8. The pet communication and entertainment device of claim 7 further comprising a memory component operatively coupled to said processor and configured to store executable instructions, configuration parameters, user-defined settings, and data associated with actuation of said plurality of paw-actuatable control regions.

9. The pet communication and entertainment device of claim 8, wherein said display is a touch-sensitive display configured to present visual content.

10. A pet communication and entertainment device comprising:

a housing;

a processor;

a wireless communication module;

a plurality of touch-actuatable control regions; and a paired remote device;

wherein said housing comprising a material selected from the group consisting of a reinforced polymer, a rubberized composite, and a silicone-coated plastic;

wherein said processor comprises one or more selected from the group consisting of microprocessors, microcontrollers, system-on-chip (SoC) devices, and programmable logic components configured to execute instructions, process input signals generated by pet actuation, and control execution of received signals from actuation of said plurality of touch-actuatable control regions and said paired remote device;

wherein said plurality of touch-actuatable control regions are configured to detect input generated by an animal's body part;

wherein a front surface of said housing comprises a display for visually presenting one or more selected from the group consisting of an image, an animation, a video, an icon, and a status indicator;

wherein said wireless communication module is operatively coupled to said processor and is configured to enable data transmission and reception between the pet communication and entertainment device and one or more said paired remote device;

wherein said plurality of touch-actuatable control regions comprise one or more selected from the group consisting of a music control region, a game control region, a communication control region, and a visual interaction control region; and further wherein said plurality of touch-actuatable control regions are visually represented by one or more selected from the group consisting of high-contrast shapes, symbols, and pictorial representations corresponding to a function of each of said plurality of touch-actuatable control regions.

11. The pet communication and entertainment device of claim 10, wherein said music control region comprises playback of audio content selected from the group consisting of calming sounds, music, and prerecorded messages when actuated by the pet.

12. The pet communication and entertainment device of claim 11, wherein said game control region is configured to initiate one or more interactive games selected from the group consisting of moving visual targets, sound-triggered responses, and timed activities for mental stimulation of the pet when actuated by the pet.

13. The pet communication and entertainment device of claim 12, wherein said communication control region is configured to initiate an audio connection with said paired remote device when actuated by the pet.

14. The pet communication and entertainment device of claim 13, wherein said visual interaction control region is configured to initiate visual interaction features selected from one or more of the group consisting of a live video feed, capturing images, and video communication with said paired remote device when actuated by the pet.

15. The pet communication and entertainment device of claim 14, wherein said housing comprising one or more audio output elements configured to emit sound in response to actuation of said plurality of touch-actuatable control regions, and further wherein said housing comprising an audio input opening configured to capture one or more selected from the group consisting of ambient sounds, animal vocalizations, and audio generated during a communication session for transmission to said paired remote device.

16. A method of pet communication and pet entertainment, the method comprising the steps of:

providing a housing, a processor, a wireless communication module, a plurality of touch-actuatable control regions; and a paired remote device, wherein said processor comprises one or more selected from the group consisting of microprocessors, microcontrollers, system-on-chip (SoC) devices, and programmable logic components configured to execute instructions, process input signals generated by pet actuation, and control execution of received signals from actuation of said plurality of touch-actuatable control regions and said paired remote device;

detecting input generated by an animal's body part with said plurality of touch-actuatable control regions;

visually presenting one or more selected from the group consisting of an image, an animation, a video, an icon, and a status indicator to a display on a front surface of said housing;

wherein said wireless communication module is operatively coupled to said processor and is configured to enable data transmission and reception between the pet communication and entertainment device and one or more said paired remote device;

wherein said plurality of touch-actuatable control regions comprise one or more selected from the group consisting of a music control region, a game control region, a communication control region, and a visual interaction control region;

visually representing said plurality of touch-actuatable control regions by one or more selected from the group consisting of high-contrast shapes, symbols, and pictorial representations corresponding to a function of each of said plurality of touch-actuatable control regions; and actuating at least one of said plurality of touch-actuatable control regions by the pet.

17. The method of pet communication and pet entertainment of claim 16, wherein said music control region comprises playback of audio content selected from the group consisting of calming sounds, music, and prerecorded messages when actuated by the pet.

18. The method of pet communication and pet entertainment of claim 17, wherein said game control region is configured to initiate one or more interactive games selected from the group consisting of moving visual targets, sound-triggered responses, and timed activities for mental stimulation of the pet when actuated by the pet.

19. The method of pet communication and pet entertainment of claim 18, wherein said communication control region is configured to initiate an audio connection with said paired remote device when actuated by the pet.

20. The method of pet communication and pet entertainment of claim 19, wherein said visual interaction control region is configured to initiate visual interaction features selected from one or more of the group consisting of a live video feed, capturing images, and video communication with said paired remote device when actuated by the pet.

* * * * *